United States Patent
Tang et al.

(10) Patent No.: US 10,425,514 B2
(45) Date of Patent: Sep. 24, 2019

(54) CAMERA-CONTAINING ASSEMBLY AND RELATED TERMINAL AND ELECTRONIC DEVICE

(71) Applicant: GUANGDONG OPPO MOBILE TELECOMMUNICATIONS CORP., LTD., Dongguan, Guangdong (CN)

(72) Inventors: Yimei Tang, Guangdong (CN); Xinquan Zhou, Guangdong (CN); Yi Sun, Guangdong (CN); Jingming Wan, Guangdong (CN); Haijin Hu, Guangdong (CN); Guangwei Zhang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/861,805

(22) Filed: Jan. 4, 2018

(65) Prior Publication Data
US 2018/0198898 A1     Jul. 12, 2018

(30) Foreign Application Priority Data
Jan. 11, 2017   (CN) .......................... 2017 1 0021015

(51) Int. Cl.
  *H04N 5/225*   (2006.01)
  *H04M 1/02*   (2006.01)
  *H04N 13/204*   (2018.01)

(52) U.S. Cl.
  CPC ........ *H04M 1/0264* (2013.01); *H04N 5/2253* (2013.01); *H04N 5/2257* (2013.01); *H04N 13/204* (2018.05); *H04N 5/2254* (2013.01); *H04N 5/2258* (2013.01)

(58) Field of Classification Search
  CPC . H04M 1/0264; H04N 5/2257; H04N 5/2253; H04N 5/2258; H04N 5/2254; H04N 13/00; H04N 13/20; H04N 13/204; H04N 13/239
  USPC .................................................. 348/373, 374
  See application file for complete search history.

(56) References Cited

U.S. PATENT DOCUMENTS

| 8,346,309 | B2 * | 1/2013 | Han | H04M 1/0272 345/641 |
| 2005/0045358 | A1 | 3/2005 | Arnold | |
| 2005/0211888 | A1 * | 9/2005 | Sato | H01L 27/14618 250/239 |

(Continued)

FOREIGN PATENT DOCUMENTS

| CN | 202153756 U | 2/2012 |
| CN | 104797102 A | 7/2015 |

(Continued)

OTHER PUBLICATIONS

English translation of CN 204598042 U.

(Continued)

*Primary Examiner* — Albert H Cutler
(74) *Attorney, Agent, or Firm* — Ladas & Parry LLP

(57) ABSTRACT

A camera assembly is provided, including a camera module and a shield; the shield is positioned at a side of the camera module and configured to reduce magnetic field interference between the camera module and an electronic component. A terminal and an electronic device including the camera module and the shield are also provided.

22 Claims, 5 Drawing Sheets

(56) References Cited

U.S. PATENT DOCUMENTS

| | | | |
|---|---|---|---|
| 2005/0253951 A1* | 11/2005 | Fujimoto | H04N 5/2253 |
| | | | 348/335 |
| 2006/0038630 A1* | 2/2006 | Kawaguchi | H01F 1/00 |
| | | | 333/12 |
| 2006/0272856 A1 | 12/2006 | Arnold | |
| 2006/0272857 A1 | 12/2006 | Arnold | |
| 2008/0174692 A1 | 7/2008 | Kusaki et al. | |
| 2009/0195897 A1 | 8/2009 | Tsai et al. | |
| 2010/0006965 A1 | 1/2010 | Shiung | |
| 2011/0234890 A1 | 9/2011 | Kobayashi et al. | |
| 2013/0041226 A1* | 2/2013 | McDowall | A61B 1/00009 |
| | | | 600/166 |
| 2013/0128108 A1 | 5/2013 | Oh et al. | |
| 2014/0063265 A1 | 3/2014 | Shukla et al. | |
| 2014/0268617 A1 | 9/2014 | Mehta et al. | |
| 2015/0037025 A1 | 2/2015 | Kim et al. | |
| 2016/0057327 A1 | 2/2016 | Oh et al. | |
| 2017/0092438 A1 | 3/2017 | Mehta et al. | |
| 2018/0352127 A1* | 12/2018 | Wang | H04N 5/225 |

FOREIGN PATENT DOCUMENTS

| | | |
|---|---|---|
| CN | 204598042 U | 8/2015 |
| CN | 106603776 A | 4/2017 |
| WO | 2004/114731 A2 | 12/2004 |
| WO | 2013/097644 A1 | 7/2013 |
| WO | 2014/145384 A1 | 9/2014 |

OTHER PUBLICATIONS

European Search Report in European application No. 18150324.4, dated Aug. 8, 2018.
International Search Report and Written Opinion dated Mar. 27, 2018 for Application No. PCT/CN2017/119629.
Partial European Search Report dated May 8, 2018 for Application No. EP 18 15 0324.
English abstract of CN 106603776 A.
English abstract of CN 104797102 A.
EP Office Action dated Jun. 4, 2019 for Application No. EP 18150324.4.

\* cited by examiner

CAMERA-CONTAINING ASSEMBLY AND RELATED TERMINAL AND ELECTRONIC DEVICE

CROSS REFERENCE TO RELATED APPLICATION

This application claims the priority benefit of Chinese Patent Application No. 201710021015.X, titled "CAMERA ASSEMBLY, TERMINAL AND ELECTRONIC DEVICE" filed on Jan. 11, 2017, the contents of which are incorporated by reference herein in their entirety for all purposes.

TECHNICAL FIELD

The present disclosure relates to the field of mobile communication, and particularly to a camera-containing assembly, a terminal and an electronic device.

BACKGROUND TECHNOLOGY

With the development of higher integration of the terminals, the space inside a terminal is becoming smaller and smaller. Internally of the terminal, both the camera module and the handset assembly are usually arranged in the upper part above the terminal display screen, leaving a small distance therebetween. Thus, the performance of the handset assembly and camera module may be affected by the magnetic crosstalk occurred between them.

SUMMARY

Embodiments of the present disclosure provide a cameral assembly, a terminal and an electronic device, which can solve the problem of magnetic crosstalk between the camera module and another electronic component, for example, the handset assembly.

In one aspect, a camera-containing assembly is provided. The camera-containing assembly includes a camera module and a shield, the first shield is positioned at a side of the camera module and configured to reduce magnetic field interference between the camera module and an electronic component.

In another aspect, a terminal is provided. The terminal includes a camera module, a shield and a handset assembly; the shield is positioned between the camera module and the handset assembly for reducing magnetic field interference between the camera module and the handset assembly.

In yet another aspect, an electronic device is provided. The electronic device includes a bracket, a camera module, a handset assembly, and a shield; the camera module, the handset assembly and the shield are disposed on the bracket, the shield being positioned between the camera module and the handset assembly for reducing magnetic field interference between the camera module and the handset assembly.

Other features of the technology will be apparent from consideration of the information contained in the following detailed description.

BRIEF DESCRIPTION OF THE DRAWINGS

For better illustration, a brief description of the accompanying drawings used herein is given below. It is to be understood that the drawings listed below are only examples without construed as limitation to the scope of the disclosure.

DETAILED DESCRIPTION OF THE EMBODIMENTS

Figure 1:
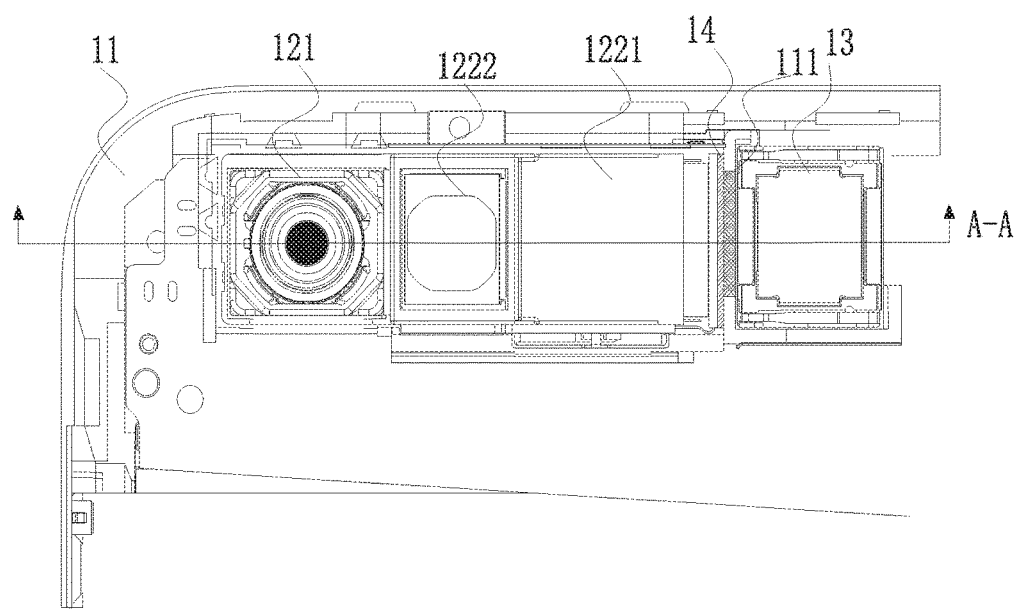
FIG. 1 is a structural schematic diagram of a terminal according to an embodiment of disclosure.

The embodiments of the present disclosure will now be described in conjunction with the accompanying drawings, and it will be apparent that the described embodiments are merely part of the embodiments of the disclosure and are not intended to be exhaustive. All other embodiments obtained by those skilled in the art without making creative work are within the scope of the present disclosure, based on the embodiments of the present disclosure.

In the description of the present disclosure, it is to be understood that the azimuthal or positional relationships indicated by the terms, including "center", "longitudinal", "lateral", "length", "width", "thickness", "upper", "lower", "front", "rear", "left", "right", "vertical", "horizontal", "top", "bottom", "internal", "external", "clockwise", "counterclockwise", etc., are based on the drawings, and are merely for the purpose of facilitating the description and simplification of the description, rather than indicating or implying that the device or element referred to must have a specific orientation, constructed and operated in a particular orientation. Therefore, they cannot be construed as limiting the present disclosure.

In the description of the present disclosure, unless otherwise specified and defined, the terms "install", "connect" and "connection" should be understood in a broad sense. For example, fixed connected, removable connected or integrally connected; mechanically connected, electrically connected or communicating with each other; directly connected or indirectly connected by intermediate medium; internal connection of two elements or interaction relationship thereof. The specific meaning of the above terms in the present disclosure can be understood by those skilled in the art in light of specific circumstances.

The following disclosure provides a number of different embodiments or examples for implementing the different structures of the present disclosure. In order to simplify the disclosure of the present disclosure, components and arrangements of specific examples are described below. They are merely exemplary and are not intended to limit the disclosure. In addition, the present disclosure may repeat the reference numerals and/or reference numerals in different examples, for the sake of simplicity and clarity, which in itself does not indicate the relationship between the various embodiments and/or arrangements discussed. In addition, the present disclosure provides examples of various specific processes and materials, but those of ordinary skill in the art will appreciate the use of other processes and/or other materials.

Figure 2:
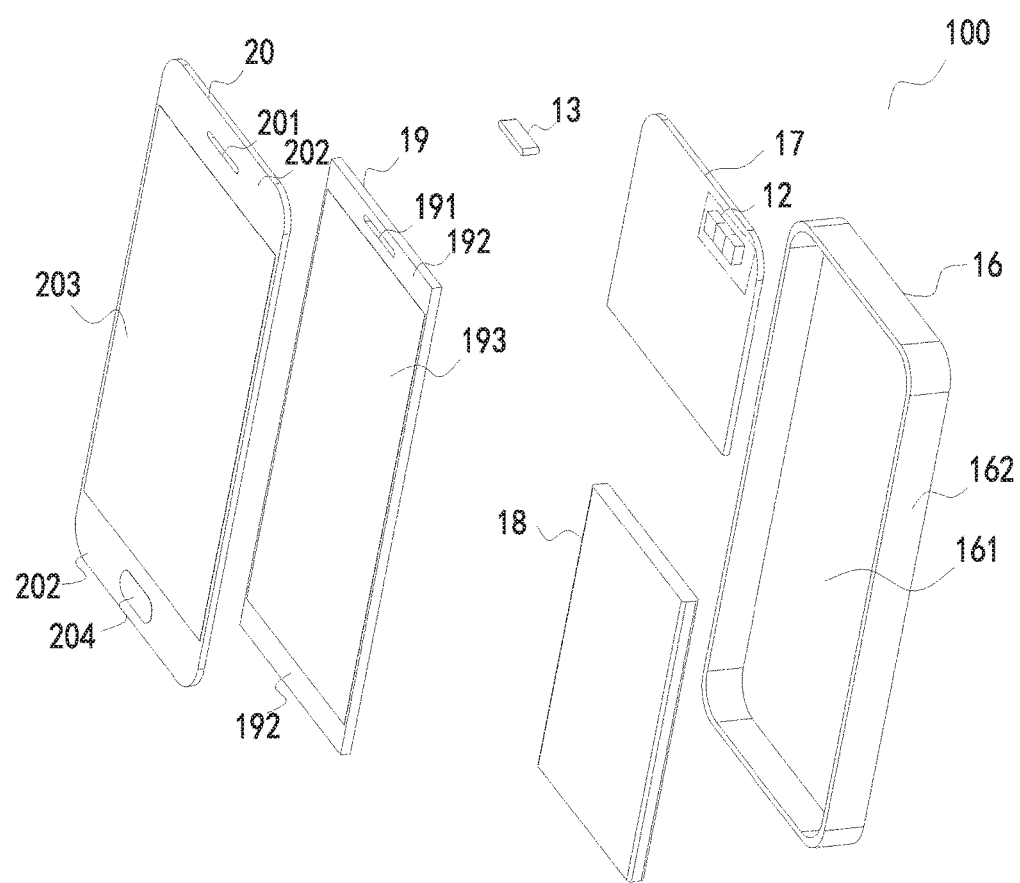
FIG. 2 is an exploded schematic diagram of the terminal of FIG. 1.
Figure 3:
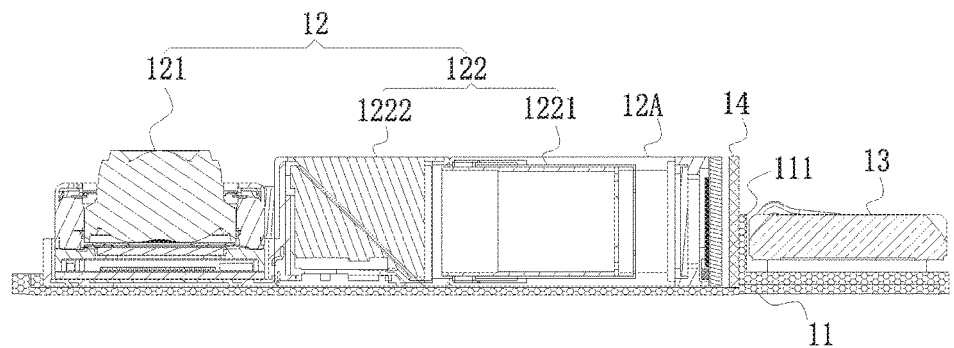
FIG. 3 is a cross section diagram of the terminal of FIG. 1 along a direction A-A.

Referring to FIGS. 1-3, a terminal is illustrated as an example of an electronic device. FIG. 1 is a structural schematic diagram of a terminal according to an embodiment of the disclosure. FIG. 2 is an exploded schematic diagram of the terminal of FIG. 1. FIG. 3 is a cross section diagram of the terminal of FIG. 1 along a direction A-A. Only portions related to the embodiments of the present disclosure are shown in FIGS. 1-3. It is to be understood that the terminal 100 in the embodiments of the present disclosure further includes components not shown in FIGS. 1-3, such as a processor, a memory and/or a sensor. The structure of the terminal 100 shown in FIGS. 1-3 is not intended to limit the specific structure of the terminals 100 in the embodiments of the present disclosure.

The terminal 100 in this embodiment includes a bracket 11, a camera module 12, a handset assembly 13, a shield 14, a rear cover 16, a circuit board 17, a battery 18, a display 19 and a cover panel 20.

The cover panel 20 includes a non-display area 202 and a display area 203. The display area 203 of the front cover 20 may be used for displaying an image or for a user to perform touch operation or the like. The non-display area at the top of the cover panel 20 corresponds to an opening 201 for the handset assembly 13 to emit a sound. A fingerprint identification module 204 is provided on the non-display area 202 at the bottom. The fingerprint identification module 204 may be used to acquire the fingerprint information of the user.

The display 19 is mounted under the front cover 20. The display 19 includes a non-display area 192 and a display area 193. The non-display area at the top corresponds to an opening 191 for the handset assembly 13 to emit a sound. Ink is provided underneath the transparent glass corresponding to the non-display area 192 other than the opening 191 for covering the internal structure of the terminal 100.

In some implementations, the front cover 19 may be made of a material such as glass, ceramic or sapphire, etc.

The battery 18 is mounted in the rear cover 16 and is electrically connected to the circuit board 17 to supply power to the circuit board 17.

The rear cover 16 is provided with a light exit hole for the camera module 12 to capture the external light through the light exit hole. The rear cover 16 includes a body 161 and a side wall 162 provided at the periphery of the body. The side wall 162 extends in a direction towards the cover panel 20.

The bracket 11 is disposed between the rear cover 16 and the display 19 for supporting the various components inside the terminal 100. In this embodiment, the bracket 11 is used to fixedly arrange the camera module 12, the handset assembly 13, the first shield 14 and the circuit board 17. It is to be understood that the first shield 14 can be arranged on the bracket 11, or can be integrated into the camera module 12 or the handset assembly 13. For example, the first shield 14 can be provided on a lateral wall of the camera module 12 adjacent to the camera module 12, or on a lateral wall of the handset assembly 13 adjacent to the camera module 12.

The bracket 11 is provided with a support member 111 disposed between the camera module 12 and the handset assembly 13. An end of the support member 111 is fixedly arranged on the bracket 11, and the other end of the support member 111 is used to support the circuit board 17 located above the handset assembly 13. As an implementation, the material of the support member 111 may be a metal material such as a magnesium alloy and the like. It is to be understood that, in other embodiments, the support member 111 may be other material as long as the overall strength of the bracket 11 can be enhanced, and is not limited thereto.

As an implementation, the support member 111 and the bracket 11 are integrally formed; that is, the support member 111 and the bracket 11 are made of the same material. It is to be understood that in other implementations, the material of the support 111 and the material of the bracket 11 may be different, that is, the support 111 is formed in advance and then fixed to the bracket 11. The way of fixing between the support member 111 and the bracket 11 is not limited herein.

The camera module 12 is arranged on the bracket 11. The camera module 12 includes a main camera module 121 and an auxiliary camera module 122. The auxiliary camera module 122 includes an auxiliary camera 1221 and a light guide 1222.

As an implementation, the main camera module 121, the light guide 1222 and the auxiliary camera 1221 are arranged side by side, and the light guide 1222 is arranged between the main camera module 121 and the auxiliary camera 1221. The light entrance surface of the light guide 1222 is in parallel to the light entrance surface of the main camera module 121; that is, the light entrance surface of the light guide 1222 is in a direction towards the rear cover 16 of the terminal 100. The light exit surface of the light guide 1222 is opposite to the light entrance surface of the auxiliary camera 1221. The light entrance surface of the auxiliary camera 1221 is towards the light guide 122; that is, the light entrance surface of the auxiliary camera 1221 is in a direction towards the main camera module 121. The auxiliary camera 1221 has a length greater than the length of the main camera module 121.

When the main camera module 121 and the auxiliary camera module 122 are operated at the same time, the main camera module 121 obtains the external light through the light entrance surface of the main camera, and the auxiliary camera module 122 obtains the external light by the light guide 1222 guiding the external light into the auxiliary camera 1221, such that dual camera shooting is achieved.

In an embodiment, the light guide 1222 is a prism. In other embodiments, other components for guiding the external light to the auxiliary camera 1221 also be used, and no particular limitation is made herein.

In an embodiment, the handset assembly 13 is disposed on the bracket 11. A first shield 14 is provided between the hand assembly 13 and the camera module 12 in order to reduce and shield the magnetic field interference between them, due to the fact that the hand assembly 13 and the camera module 12 are disposed close to each other.

Referring to FIG. 3, in the embodiment, one end of the first shield 14 is fixedly provided on the bracket 11, and the other end of the first shield 14 is flush with the camera module 12A, i.e., the height of the first shield 14 is the same to the height of the camera module 12A. In this way the magnetic field interference between the handset assembly 13 and the camera module 12 is significantly reduced.

Optionally, in other embodiments, the height of the first shield 14 may also be slightly higher than the camera module 12A or below the camera module 12A, as long as the first shield 14 can substantially cut off the magnetic field of the handset assembly 13 in the direction towards the camera module 12. For example, the other end of the first shield 14 is flush with the support member 111 or the handset assembly 13.

The first shield 14 is of a flat plate shape. In order to save space, one side surface of the first shield 14 is in contact with one side surface of the support member 111. Optionally, in other embodiments, the first shield 14 may also be of other shapes, and the first shield 14 and the support member 111 may be spaced apart. It is to be understood that the first shield 14 shown in FIG. 3 is illustrative rather than limiting the shape, location and number of the first shield 14. Although not shown, there can be two first shields 14 provided respectively on each side of the support member 111.

In order to shield the electromagnetic wave, the material of the first shield 14 may be a metal magnetically shielded material such as stainless steel or the like.

Optionally, the material of the first shield 14 may also be a wave absorbing material. In this case, the first shield 14 may be a single-layer plate type absorbing material, a double-layer plate type absorbing material, or a multilayer plate type absorbing material.

Since the wave absorbing material has better performance than the metal magnetically shielded material in absorbing the electromagnetic wave, the thickness of the first shield 14 made of the wave absorbing material can be smaller than that made of the metal magnetically shielded material, so as to save the space within the terminal 100. In addition, in the case where the thicknesses are the same, the first shield 14 made of the wave absorbing material has a better magnetic shielding effect than that made of the metal magnetically shielded material, and can better reduce the magnetic field interference.

In other embodiments, the wave absorbing material and the metal magnetically shielded material may also be used in combination. For example, when the first shield 14 is made of a metal magnetically shielded material, the wave absorbing material may be sprayed on the side surface of the first shield 14 adjacent to the camera module 12 and/or adjacent to the handset assembly 13. Optionally, the combination illustrated in FIGS. 4 to 8 may be used.

Figure 4:
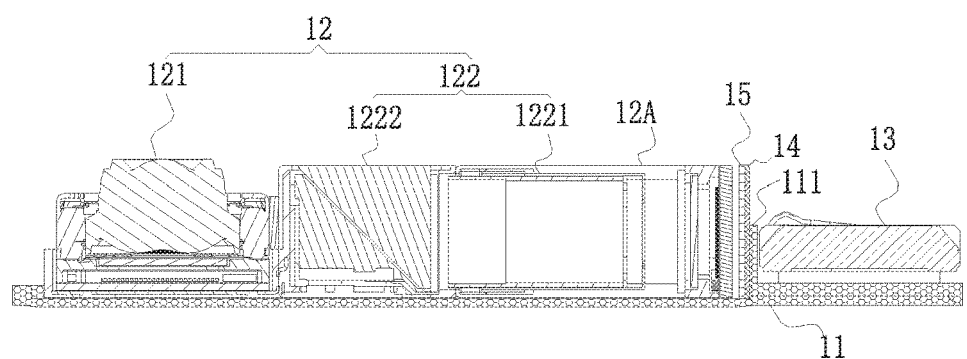
FIG. 4 is a cross section diagram of the terminal of FIG. 1 along a direction A-A.

Referring to FIG. 4, in an embodiment, the terminal 100 further includes a second shield 15 in case the first shield 14 is made of a metallic magnetically shielded material. The material of the second shield 15 is a wave absorbing material. The second shield 15 is fixedly provided on the side surface of the first shield 14 by bounding or the like.

The size of the second shield 15 may be the same as the size of the first shield 14. There may be one or more second shields 15. It is to be understood that the second shield 15 can be provided on at least one side surface of the first shield 15. When there is one second shield 15, the second shield 15 may be arranged on the side surface of the first shield 14 adjacent to the camera module 12 or adjacent to the handset assembly 13, as shown in FIG. 4. In FIG. 4, the second shield 15 is arranged on the side surface of the first shield 14 adjacent to the camera module 12.

Figure 5:
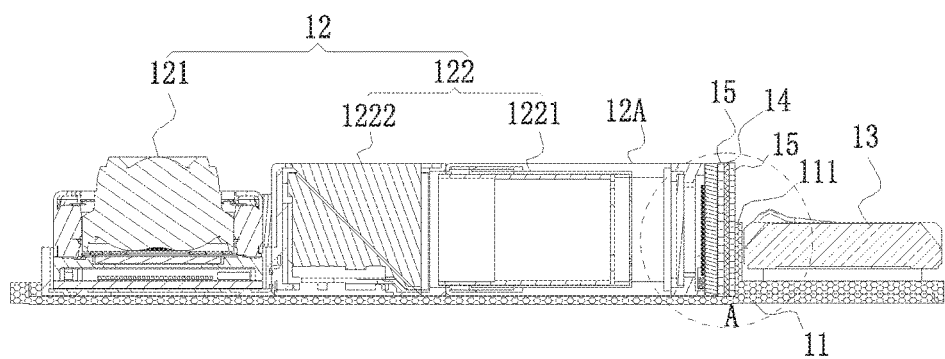
FIG. 5 is a further cross section diagram of the terminal of FIG. 1 along a direction A-A.

When there are two second shields 15, the second shield 15 may be arranged on the side surface of the first shield 14 adjacent to the camera module 12 and adjacent to the handset assembly 13, as shown in FIG. 5.

Figure 6:
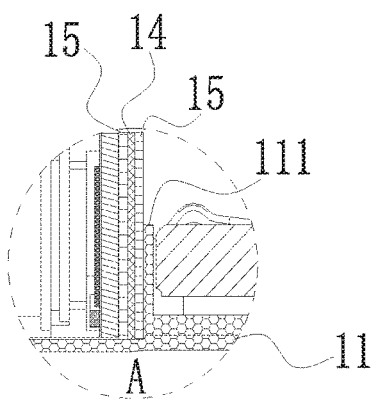
FIG. 6 is an enlarged view of the portion marked "A" in FIG. 5.

In order to better illustrate the positional relationship between the first shield 14 and the second shield 15 in FIG. 5, the portion marked "A" in FIG. 5 is enlarged, as shown in FIG. 6.

As can be seen from FIG. 6, the two second shields 15 hold the first shield 14 in the middle, and the overall thickness of the two second shields 15 and a first shield 14 may be less than or equal to the distance between the support member 111 and the camera module 12.

It is to be understood that, in other embodiments, the combination can be two first shields 14 and one second shield 15, i.e. the two first shields 14 hold the second shield 15 in the middle. Although not shown, it is to be understood that two first shields or second shields can also be provided respectively on both sides of the support member 111; the arrangement of the first shield 14 and the second shield 15 may not be enumerated here.

Figure 7:
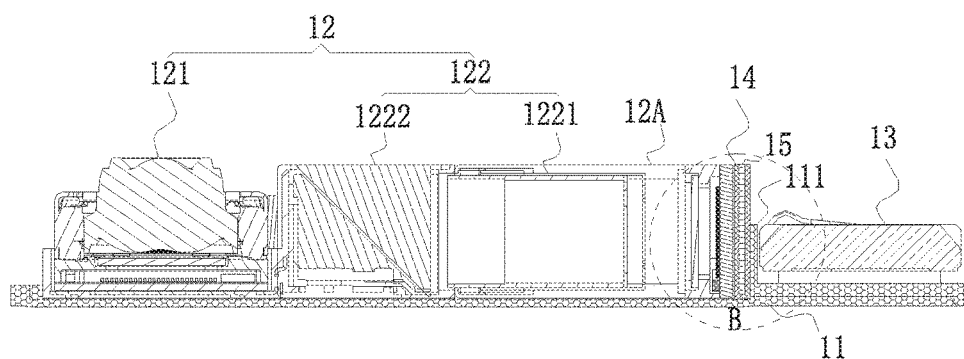
FIG. 7 is a further cross section diagram of the terminal of FIG. 1 along a direction A-A.
Figure 8:
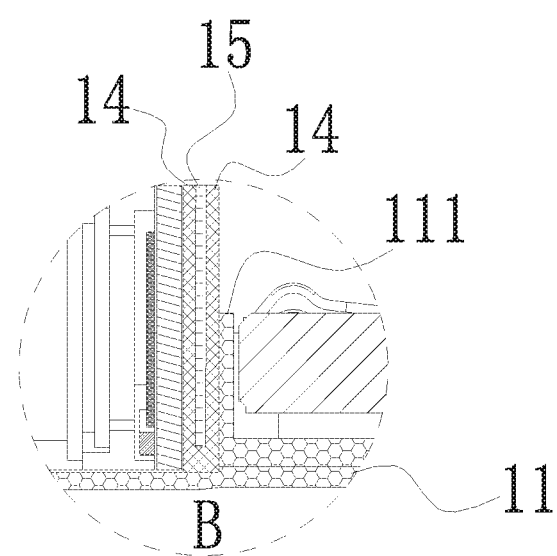
FIG. 8 is an enlarged view f the portion marked "B" in FIG. 7.

Referring to FIGS. 7 and 8, in an embodiment, the first shield 14 is provided with a groove in which the second shield 15 is placed, i.e., a heat absorbing material is placed in the groove. In this case, the size of the second shield 15 is smaller than the size of the first shield 14.

Since the first shield 14 or the combination of the first shield and the second shield 15 is provided between the camera module 12 and the handset assembly 13, it is possible to shield the magnetic field between the camera module 12 and the handset assembly 13 and substantially prevent the two from interfering with each other.

An embodiment of the disclosure provides a terminal 100, in which a first shield 14 is provided between the camera module 12 and the handset assembly 13. The magnetic field interference between the camera module 12 and the handset assembly 13 can be reduced by the first shield 14. Thus, the performance of the handset assembly 13 and the camera module 12 can be prevented as much as possible from being affected by the magnetic field of each other, and the handset assembly 13 and camera module 12 can run in a good environment.

In view of the foregoing, although the present disclosure has been disclosed by way of preferred embodiments, the above-described preferred embodiments are not intended to limit the present disclosure. It will be apparent to those skilled in the art that various changes and modifications may be made therein without departing from the spirit and scope of the disclosure. The scope of protection of the present disclosure is defined by the scope of the claims.

What is claimed is that:

1. A camera-containing assembly comprising:
   a camera module; and
   a shield positioned at a side of the camera module and configured to reduce magnetic field interference between the camera module and an electronic component;
   wherein the camera module comprises a main camera module and an auxiliary camera module, the main camera module comprises a main camera, and the auxiliary camera module comprises an auxiliary camera and a light guide; wherein the light guide is disposed between the main camera module and the auxiliary camera for guiding light into the auxiliary camera to achieve dual camera shooting;
   wherein the light guide is arranged with a light entrance surface thereof in parallel with a light entrance surface of the main camera module, and arranged with a light exit surface thereof opposite to a light entrance surface of the auxiliary camera;
   wherein the main camera module is arranged to obtain external light through a light entrance surface of the main camera, and the auxiliary camera module is arranged to obtain external light by the light guide guiding the external light into the auxiliary camera.

2. The camera-containing assembly of claim 1, wherein the shield is located on a side wall of the camera module, and the shield is made of a wave absorbing material.

3. The camera-containing assembly of claim 1, wherein the shield and the camera module define a gap therebetween, and the shield is made of a wave absorbing material.

4. The camera-containing assembly of claim 1, wherein the shield is made of a metal magnetically shielded material, and the camera-containing assembly further comprises another shield made of a wave absorbing material.

5. The camera-containing assembly of claim 4, wherein the another shield is fixedly arranged on at least a side of the shield made of a metal magnetically shielded material.

6. The camera-containing assembly of claim 4, the shield made of a metal magnetically shielded material is provided with a groove for accommodating the another shield.

7. The camera-containing assembly of claim 1, wherein the shield is arranged to be integrated into the camera module; and the shield has a height greater or less than a height of the camera module.

8. The camera-containing assembly of claim 1, wherein the shield is arranged to be made of a single-layer plate type absorbing material, a double-layer plate type absorbing material or a multilayer plate type absorbing material.

9. The camera-containing assembly of claim 1, wherein the shield comprises two first shields and a second shield, and the two first shields are arranged to hold the second shield in the middle.

10. A terminal, comprising:
a camera module;
a shield; and
a handset assembly,
wherein the shield is positioned between the camera module and the handset assembly for reducing magnetic field interference between the camera module and the handset assembly;
wherein the camera module comprises a main camera module and an auxiliary camera module, the main camera module comprises a main camera, and the auxiliary camera module comprises an auxiliary camera and a light guide; wherein the light guide is disposed between the main camera module and the auxiliary camera for guiding light into the auxiliary camera to achieve dual camera shooting;
wherein the light guide is arranged with a light entrance surface thereof in parallel with a light entrance surface of the main camera module, and arranged with a light exit surface thereof opposite to a light entrance surface of the auxiliary camera;
wherein the main camera module is arranged to obtain external light through a light entrance surface of the main camera, and the auxiliary camera module is arranged to obtain external light by the light guide guiding the external light into the auxiliary camera.

11. The terminal of claim 10, wherein the shield is located on a side wall of the camera module, and the shield is made of a wave absorbing material.

12. The terminal of claim 10, wherein the shield and the camera module define a gap therebetween, and the shield is made of a wave absorbing material.

13. The terminal of claim 10, wherein the shield is made of a metal magnetically shielded material, and the terminal further comprises another shield made of a wave absorbing material.

14. The terminal of claim 13, wherein the another shield is fixedly arranged on at least a side of the first shield made of a metal magnetically shielded material.

15. The terminal of claim 13, the shield made of a metal magnetically shielded material is provided with a groove for accommodating the another shield.

16. An electronic device, comprising:
a bracket;
a camera module;
a handset assembly; and
a shield,
wherein the camera module, the handset assembly and the shield are disposed on the bracket, the shield being positioned between the camera module and the handset assembly for reducing magnetic field interference between the camera module and the handset assembly;
wherein the camera module comprises a main camera module and an auxiliary camera module, the main camera module comprises a main camera, and the auxiliary camera module comprises an auxiliary camera and a light guide; wherein the light guide is disposed between the main camera module and the auxiliary camera for guiding light into the auxiliary camera to achieve dual camera shooting;
wherein the light guide is arranged with a light entrance surface thereof in parallel with a light entrance surface of the main camera module, and arranged with a light exit surface thereof opposite to a light entrance surface of the auxiliary camera;
wherein the main camera module is arranged to obtain external light through a light entrance surface of the main camera, and the auxiliary camera module is arranged to obtain external light by the light guide guiding the external light into the auxiliary camera.

17. The electronic device of claim 16, wherein the shield comprises a first shield and a second shield, and at least one of the first shield and the second shield is made of wave absorbing material.

18. The electronic device of claim 16, wherein one end of the shield is fixedly arranged on the bracket, and the other end of the shield is flush with the camera module.

19. The electronic device of claim 16, wherein the bracket is provided with a support member between the camera module and the handset assembly, a side surface of the shield being in contact with a side surface of the support member.

20. The electronic device of claim 19, wherein two shields are provided respectively on each side of the support member.

21. The electronic device of claim 16, wherein the shield and the camera module define a gap therebetween.

22. The electronic device of claim 16, wherein the auxiliary camera is arranged with a light exit surface thereof in a direction towards the main camera module, the light guide is arranged with the light exit surface thereof in parallel with a light exit surface of the main camera module, and the auxiliary camera has a length greater than a length of the main camera module.

* * * * *